United States Patent
Sung et al.

(10) Patent No.: US 6,537,362 B1
(45) Date of Patent: Mar. 25, 2003

(54) POLYPHOSPHORIC ACID SWELLING OF ORGANIC PIGMENTS

(75) Inventors: Edward H. Sung, Cincinnati, OH (US); Humberto Velasquez, Cincinnati, OH (US); George H. Roberston, Loveland, OH (US); Veronica L. Chambers, Cincinnati, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/710,274

(22) Filed: Nov. 10, 2000

(51) Int. Cl.⁷ .......................... C09B 67/14; C09B 67/16
(52) U.S. Cl. .................. 106/412; 106/413; 106/493; 106/494; 106/495; 106/496; 106/497; 106/498
(58) Field of Search .................. 106/410, 412, 106/413, 493, 494, 495, 496, 497, 498

(56) References Cited

U.S. PATENT DOCUMENTS

| | | | | |
|---|---|---|---|---|
| 2,716,649 A | | 8/1955 | Brouillard | 260/314.5 |
| 3,020,279 A | | 2/1962 | Woodlock et al. | 260/279 |
| 3,116,296 A | | 12/1963 | Hotovy et al. | 260/279 |
| 3,257,405 A | * | 6/1966 | Gerson et al. | 260/279 |
| 3,261,837 A | | 7/1966 | Bohler | 260/279 |
| 3,264,297 A | | 8/1966 | Streiff | 260/279 |
| 3,265,699 A | | 8/1966 | Jaffe | 260/279 |
| 3,433,790 A | | 3/1969 | Adachi et al. | 260/279 |
| 3,697,526 A | | 10/1972 | Pugin | 260/281 |
| 4,432,796 A | | 2/1984 | Santimauro | 106/19 |
| 4,655,845 A | | 4/1987 | Spietschka et al. | 106/309 |
| 6,013,126 A | * | 1/2000 | Shannon et al. | 106/493 |
| 6,068,695 A | * | 5/2000 | Flatt et al. | 106/497 |
| 6,241,814 B1 | * | 6/2001 | Urban et al. | 106/497 |
| 6,284,890 B1 | * | 9/2001 | Mitina | 546/56 |

FOREIGN PATENT DOCUMENTS

| | | | |
|---|---|---|---|
| EP | 1 031 615 | * | 8/2000 |
| GB | 948307 | | 1/1964 |

* cited by examiner

*Primary Examiner*—Anthony J. Green
(74) *Attorney, Agent, or Firm*—Sidney Persley

(57) ABSTRACT

A method of conditioning an organic crude pigment by treating, under high shear, 1 part by weight of the crude pigment and about 0.5 to 1.9 parts by weight of polyphosphoric acid or polyphosphoric acid methyl ester at a temperature ranging from about 90 to 160° C.

8 Claims, No Drawings

POLYPHOSPHORIC ACID SWELLING OF ORGANIC PIGMENTS

FIELD OF THE INVENTION

This invention relates to a process for conditioning an organic pigment using low amounts of polyphosphoric acid at a particular range of temperature, and more particularly to an improved process of finishing organic pigment in a finely-divided form exhibiting high tinctorial strength and tinctorial stability in lacquers and in coloration of plastics.

BACKGROUND OF THE INVENTION

It is conventional to condition organic pigment such as phthalocyanine, quinacridone, perylene, carbazole violet by a process known as acid swelling. Such a process involves mixing pigment in sulfuric acid of certain ratios. With such ratios of acid, the pigment does not dissolve nor is it crystallized but is caused.to swell and after removal of the liquid and drying, the pigment of a soft textured product having a very fine particle size is obtained. The amount of acid used in this treatment must be sufficient to obtain a stirrable slurry. Generally, a ratio of the order of one part pigment to 3–20 parts sulfuric acid has been found to produce satisfactory results.

U.S. Pat. No. 4,432,796 discloses the use of polyphosphoric acid has to condition pigments. However, the amount of polyphosphoric acid used is 2–20 and preferably 3–8 parts by weight, based on 1 part by weight of the 100% pigment. The concentration of the polyphosphoric acid is 100 to 125%. In all cases, it requires significant amount of acid which increases the production cost in order to provide an efficient agitation and effective transfer from acid swelling reactor to the digestive solvent or water for further treatment.

SUMMARY OF THE INVENTION

The present invention provides a method of conditioning an organic crude pigment comprising acid treating under high shear 1 part by weight of the pigment in about 0.5 to 1.9 parts by weight of polyphosphoric acid or polyphosphoric acid methyl ester at a temperature ranging from about 90 to 160° C.

Other objects and advantages of the present invention will become apparent from the following description and appended claims.

DETAILED DESCRIPTION OF THE INVENTION

It has now been found that the conditioning of an organic pigment such as phthalocyanine, quinacridone, perylene, carbazole violet can be achieved in a high shear mixer through acid swelling the crude in about 0.5 to 1.9 fold of concentrated polyphosphoric acid or an acidic polyphosphoric acid methyl ester at 90–160° C.

The resulting magma is then digested in water or a water miscible organic solvent to remove the phosphoric acid and provide a finely-divided product exhibiting high tinctorial strength and excellent dispersibility in lacquers and in coloration of plastics.

Suitable high shear mixing under process of the invention includes, for example, using sigma blade kneaders (available from Baker Perkins), MP mixer and twin screw extruder (available from Werner Pfleiderer).

Concentration of polyphosphoric acid and swelling temperature during the attrition are key factors not only in determining the particle size of resulting pigment but also in affecting product shade and cleanness, and must be controlled carefully.

Polyphosphoric acid is added to the crude under high shear and the crude is then charged to the reactor under elevated temperature to obtain a good firm magma. Polyphosphoric acid with concentration between 110 to 125% is used for this process, preferably between 116 to 118%. The concentration of polyphosphoric acid is dependent upon the quantity of diphosphor pentoxide dissolved. Polyphosphoric acid can be purchased commercially in the range of 117 to 120%.

The amount of polyphosphoric acid is approximately 0.5 to 1.9 fold of crude, preferably 1 to 1.5 fold. The acid is mixed with crude to form a molten magma. The amount of acid will determine the physical appearance of the resulting magma which must be wet enough to provide a uniform mixture and prevent dusting from unwetted crude. Higher amounts of polyphosphoric acid do not harm the product quality but will provide a soupy-like magma and increase the cost of production.

The polyphosphoric acid mixture is generally heat to a temperature of from about 90 to 160° C., in particular 120–135° C. for about 0.5–4 hours. While not wishing to be bound by the theory, we believe that the resulting crude reacts with polyphosphoric acid to form phosphate salt which is often in a state of oily appearance similar to that of flush product. The mixing and shearing by the high shear mixer provide a uniform mass and very often this action does generate internal heat due to friction of particles. The subsequent attrition will then cause intensive rise in reaction temperature and cooling must be applied. In some circumstances, upon cooling the resulting mixture is considerably dry and will crumble and can then be further crushed into powder.

The length of acid swelling or conditioning through, attrition is kept at 1 to 6 hours, preferably at 1 to 3 hours.

The resulting phosphate salt can be removed either by knife at high temperature similar to that of flush or by decanting as normal salt attrition material dependent upon the physical aspect of magma. The reaction medium is then suitably stirred with about 4 to 8 times the quantity of solvent, calculated on the content of pigment, and followed by wet grinding. The deagglomerated crude quinacridone is thereafter heated to a temperature of from 60–150° C., preferably 80–120° C. for about 3 to 8 hours. The salt magma can be also stirred with about 6 to 10 times of water and followed by wet grinding. The water slurry is filtered, washed with water and the resulting presscake is reslurried into solvent or water and heated to a temperature of from 60–150° C., preferably 80–120° C. for about 3 to 8 hours.

Suitable wet grinding machines for the process of the invention include, for example, colloid mills, corundum disk mills and similar apparatuses.

Suitable solvents for the process of the invention are preferably lower alcohols, ketones, acids or other basic solvents, for example, methanol, ethanol, n-propabol, isopropanol, n-butanol, iso-butanol, pentanol, hexanol, acetone, methyl ethylketone, methylisobutylketone, glacial acetic acid, dimethylforamide, dimethylsulfoxide, N-methylpyrolidone.

The pigments obtained by the process of the invention are distinguished by high tinctorial strength, a pure shade and a good dispersibility in lacquers and in the coloration of plastics.

The following examples further illustrate details of this invention. This invention, which is set forth in the foregoing disclosure, is not to be limited either in spirit or scope by these examples. Those skilled in the art will readily understand that t known variations of the conditions of the following procedures can be used. Unless otherwise noted, all temperatures are degrees Celsius and all part and percentage are by weight.

EXAMPLE 1

Polyphosphoric acid (PPA, 200 g at 117%) is added to a sigma blade kneader. While the PPA is mixing and being heated in the kneader, 100 grams of N,N-diemthylperylene-3,4,9,10-tetracarboxylic diamide crude (100 g)is gradually, added over a period of 10 minutes. This material is then mixed for additional 5 minutes. The mass is heated to a temperature between 100–110° C. and held at this temperature for 2 hours.

While this soft, flush-like magma is still hot, it is taken out of the kneader and placed in a glass jar. The magma is thoroughly mixed with 13 parts of water through homogenization for 5 minutes. The mixture is then washed with water until free of acid.

EXAMPLE 2

Presscake prepared according to Example 1 (18 g), water (250 ml), mineral spirits (18 g) and aerosol OT-75 (0.9 g) are added to a Parr pressure reactor (600 ml capacity). The mixture is mixed thoroughly through homogenization for one minute and is heated to 150° C. and held at that temperature for 6 hours. The reaction mixture is cooled to 60° C., filtered and dried to give a clean, yellowish and highly dispersible product in polyethylene extrusion.

EXAMPLE 3

Presscake prepared according to Example 1 (18 g), methanol (216 g)and aerosol OT-75 (0.9 g) are added to a Parr pressure reactor (600 ml capacity). The mixture is mixed thoroughly through homogenization for one minute and is heated to 120° C. and held at this temperature for 6 hours. The reaction mixture is cooled to 60° C., filtered and dried to give a dark, strong and yellowish pigment in acrylic enamel paint.

EXAMPLE 4

Polyphosphoric acid (150 g at 120%) is added to a Sigma blade kneader. While the PPA is mixing and being heated in the kneader, N,N=-dimethylperylene-3,4,9,10-tetracarboxylic diimide crude (150 g) is gradually added over a period of 10 minutes. This material is then mixed for additional 5 minutes. The mass is heated to a temperature between 120–135° C. and held at this temperature for 2 hours.

While this soft, flush-like magma is still hot, it is taken out of the kneader and placed in a glass jar. The magma is thoroughly mixed with methanol (1440 g) through homogenization for 5 minutes. The mixture is then transferred into a two liter Par pressure reactor and is heated slowly to 120° C. After 10 hours of holding at 120° C., the reaction mixture is cooled to 50° C., filtered and dried. The resulting material is similar to that from Experiment 2 in polyethylene extrusion.

EXAMPLE 5

Polyphosphoric acid (PPA, 200 g at 117.7%) is added to a Sigma blade kneader. While the PPA is mixing and being heated in the kneader, carbazole violet crude (100 g) and Aerosol -OT (5 g) are gradually added over a period of 10 minutes. This material is then mixed for additional 5 minutes. The mass is heated to a temperature between 124–126° C. and held at this temperature for 2 hours.

While this soft, flush-like magma is still hot, it is taken out of the kneader and placed in a glass jar. The magma is thoroughly mixed with water (1.5 L) through homogenization for 5 minutes. The mixture is then washed with water until free of acid.

The above presscake (30 g, dry basis), water (300 ml), mineral spirits (30 g), and aerosol OT-75 (1.5 g) are added to a Par pressure reactor (1 liter capacity). The mixture is mixed thoroughly through homogenization for one minute and is heated to 150° C. and held at that temperature for 4 hours. After cooling to zero pressure, the pigment is filtered, washed to a conductivity of 300 umohs and dried at 75–80° C. The resulting red shade violet is distinguished by a soft appearance and with a good dispersibility in polyethylene extrusion.

EXAMPLE 6

Polyphosphoric acid (PPA, 150 g at 117.7%) is added to a Sigma blade kneader. While the PPA is mixing and being heated in the kneader, carbazole violet crude (150 g) is gradually added over a period of 10 minutes. This material is then mixed for additional 5 minutes. The mass is heated-to a temperature between 124–126° C. and held at this temperature for 2 hours.

While this soft, flush-like magma is still hot, it is taken out of the kneader and placed in a glass jar. The magma is thoroughly mixed with methanol (1440 g) through homogenization for 5 minutes. The mixture is then heated to reflux for 8 hours. After cooling to 50° C., it is filtered, washed to a conductivity of 300 umohs and dried at 75–80° C. The resulting red shade violet is distinguished by a soft appearance with a good dispersibility in polyethylene extrusion.

EXAMPLE 7

Polyphosphoric acid (PPA, 150 g at 120%) is added to a sigma blade kneader. While the PPA is mixing and being heated in the kneader, dimethylquinacridone crude (100 g) is gradually added over a period of 10 minutes. This material is then mixed for additional 5 minutes. The mass is heated to a temperature between 124–126° C. and held at this temperature for 2 hours.

While this soft, flush-like magma is still hot, it is taken out of the kneader and placed in a glass jar. The magma is thoroughly mixed with methanol (1440 g) through homogenization for 5 minutes. The mixture is then heated to reflux for 8 hours. After cooling to 50° C., it is filtered, washed to a conductivity of 300 umohs and dried to 75–80° C. The resulting dimethylquinacridone is distinguished by a soft appearance and with a good dispersibility by polyethylene extrusion.

EXAMPLE 8

Polyphosphoric acid (PPA, 175 g at 117%) is added to a sigma blade kneader. While the PPA is mixing and being heated in the kneader, phthalocyanine blue crude (100 g) is gradually added over a period of 10 minutes. This material is then mixed for additional 5 minutes. The mass is heated to a temperature between 124–126° C. and held at this temperature for 2 hours.

While this soft, flush-like magma is still hot, it is taken out of the kneader and placed in a 16 oz. glass jar. The magma is thoroughly mixed with methanol (1440) through homogenization for 5 minutes. The mixture is then heated to reflux for 8 hours. After cooling to 50° C., it is filtered, washed to a conductivity of 300 umohs and dried at 75–80° C. The resulting red shade violet is distinguished by a soft appearance and with a good dispersibility in polyethylene extrusion.

The invention has been described in terms of preferred embodiments thereof, but is more broadly applicable as will be understood by those skilled in the art. The scope of the invention is only limited by the following claims.

What is claimed is:

1. A method of conditioning an organic pigment comprising acid treating under high shear 1 part by weight of crude organic pigment with between 0.5 to 1.9 parts by weight of polyphosphoric acid or polyphosphoric acid methyl ester at a temperature from about 90 to 160° C.

2. The method of claim 1 wherein the pigment is a perylene pigment.

3. The method of claim 1 wherein the pigment is a phthalocyanine pigment.

4. The method of claim 1 wherein the pigment is a quinacridone pigment.

5. The method of claim 1 wherein the pigment is a carbazole violet pigment.

6. The method of claim 1, wherein the conditioning is carried out in about 0.5 to 6 hours.

7. The method of claim 4, wherein the conditioning is carried out in about 1 to 3 hours.

8. The method of claim 1 further comprising digesting the conditioned pigment in water or a water miscible organic solvent, thereby isolating a further conditioned pigment.

* * * * *